(12) United States Patent
Lazzara (10) Patent No.: US 7,938,139 B2
(45) Date of Patent: *May 10, 2011

(54) SMART RESET RELIEF VALVE

(75) Inventor: Gerard S. Lazzara, Houston, TX (US)

(73) Assignee: RR Value, Inc., Houston, TX (US)

( * ) Notice: Subject to any disclaimer, the term of this patent is extended or adjusted under 35 U.S.C. 154(b) by 445 days.

This patent is subject to a terminal disclaimer.

(21) Appl. No.: 12/012,742

(22) Filed: Feb. 5, 2008

(65) Prior Publication Data

US 2008/0190486 A1    Aug. 14, 2008

Related U.S. Application Data

(60) Provisional application No. 60/900,197, filed on Feb. 8, 2007.

(51) Int. Cl.
*F16K 17/00* (2006.01)

(52) U.S. Cl. ............... 137/467; 137/514.5; 137/557; 73/1.72; 251/54

(58) Field of Classification Search ............ 137/467, 137/514.5, 557; 73/1.72; 251/54
See application file for complete search history.

(56) References Cited

U.S. PATENT DOCUMENTS

| | | | | |
|---|---|---|---|---|
| 2,552,479 A | * | 5/1951 | Copping | 251/54 |
| 2,973,776 A | * | 3/1961 | Allen | 137/467 |
| 2,973,777 A | * | 3/1961 | Troxell, Jr. | 137/467 |
| 2,984,254 A | * | 5/1961 | Allen | 137/467 |
| 3,315,701 A | * | 4/1967 | Stilwell | 137/624.18 |
| 3,698,424 A | * | 10/1972 | Wiegand | 137/467 |
| 3,730,215 A | * | 5/1973 | Conery et al. | 137/494 |
| 3,732,889 A | * | 5/1973 | Conery et al. | 137/498 |
| 4,469,125 A | * | 9/1984 | Keeney | 137/467 |
| 4,971,094 A | * | 11/1990 | Gonzalez | 137/38 |
| 5,351,714 A | * | 10/1994 | Barnowski | 137/467 |
| 5,715,861 A | * | 2/1998 | Williams | 137/467 |
| 6,035,878 A | * | 3/2000 | Adams et al. | 137/1 |
| 7,117,885 B2 | * | 10/2006 | Lazzara et al. | 137/467 |
| 7,311,117 B2 | * | 12/2007 | Lazzara et al. | 137/467 |
| 2002/0047304 A1 | * | 4/2002 | Bolitho et al. | 303/119.2 |

\* cited by examiner

*Primary Examiner* — Stephen M Hepperle
*Assistant Examiner* — Macade Brown (57) ABSTRACT

A reset relief valve with a body having an inlet port, an outlet port, and an interior wall partially defining an enclosed chamber, a piston disposed in the body and moveable between a first position at which the piston is disposed in fluid flow-blocking relationship between the inlet port and the outlet port of the body and a second position at which the piston is removed from that position, a piston having a head with opposed end surfaces one of which defines a portion of the enclosed chamber and at least one fluid flow passageway extending through the head and providing fluid communication between the enclosed chamber in the body, and a second chamber above a moveable disc in the piston and a pressure sensor in fluid communication with the fluid in the chambers. A preferred embodiment includes data acquisition software for monitoring data and storing pressure and other data to control the operation of the valve.

19 Claims, 7 Drawing Sheets

SMART RESET RELIEF VALVE

CROSS REFERENCE TO RELATED APPLICATIONS

This application takes priority from Ser. No. 60/900,197 entitled "A smart reset relief valve" filed Feb. 8, 2007 and incorporated by reference as if fully set forth herein.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of pressure relief valves and more specifically to a smart reset relief valve.

Pressure relief valves are important components in certain fluid flow systems in which undesirable high pressure may occur. In such systems, overpressure can damage valuable processing equipment or cause breakdown or rupture of weak components of the system. It is desirable that when a predetermined or pre-designated threshold pressure is exceeded, the pressure relief valve open very quickly, i.e., virtually instantaneously, to relieve system pressure. Pressure relief valves having this capability are commonly referred to as "pop-off" valves because of their rapid opening action. In carrying out the rapid opening of the valve, movable port-blocking elements within the valve, such as a plug or piston, are subjected to high acceleration and velocity, resulting in severe impact forces being imposed on the piston and other elements of the valve when the moving member reached its limit of travel away from the port-blocking position.

In prior art, the working fluid has been used to lessen impact within a valve by routing the fluid through ports or apertures in a manner to reduce impact forces. For example, U.S. Pat. No. 5,715,861 to Williams shows a fluid flow path whereby the subject fluid flows above the piston to equalize pressure. Fluid hydraulics using the pumped or working fluid have not proven to be effective in that high impact forces often tear internal parts upon initial activation of the valve. In other solutions, cushion members formed of rubber and similar resilient elastomeric materials have been used to attenuate the impact of the flow control piston subsequent to its rapid displacement from the flow-blocking position. Examples of such valves and rubber cushion members are disclosed in U.S. Pat. Nos. 2,973,776 and 2,973,777 respectively issued on Mar. 7, 1961 to Herbert Allen and John N. Troxell, Jr. While the annular elastomeric cushion rings do provide effective initial shock attenuation, the rings, aided by the initial drop in pressure at the inlet port when the piston is moved from its blocking position, promote undesirable rebounding of the piston, which inhibits the free flow of fluid to the outlet port, and impose additional repetitive shock forces on the entire valve assembly. Furthermore, the rebounding action attributed to the resilient rings often resulted in the relief valve resetting itself before release of the excess pressure, only to be triggered soon thereafter by the unrelieved pressure. This opening and unintended resetting cycle could continue for a significant period of time until it was detected, and was a major contributor to wear and failure of the internal linkage mechanism and other components of the valve.

Other prior art patents U.S. Pat. No. 7,117,885 and U.S. Pat. No. 7,311,117 to Lazzara et al. shows a reset relief valve that has a internal piston and disc configuration that greatly reduces impact forces upon activation of the valve.

Nothing in the prior art shows a computer integrated pressure sensing reset valve that can be monitored and actively controlled as shown in the present invention.

BRIEF SUMMARY OF THE INVENTION

The primary advantage of the invention is to provide a pressure relief valve that is continuously monitored during operation.

Another advantage of the invention is to provide a relief valve that utilizes a transducer in line with the ambient pressure to record and monitor valve characteristics.

Another advantage of the invention is to provide a relief valve that transmits data to a computer for later analysis of important operating characteristics.

A further advantage of the invention is to provide a relief valve that can be controlled during its operation to prevent certain damaging events to the valve or underlying pressurized system.

Yet another advantage of the invention is to provide an improved piston and transducer assembly for monitoring pressure and impact forces during operation.

Other advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a reset relief valve having a body having an inlet port, an outlet port, and an interior wall partially defining an enclosed chamber, a piston disposed in the body and moveable between a first position at which piston is disposed in fluid flow-blocking relationship between the inlet port and the outlet port of the body and a second position at which the piston is removed from said fluid flow-blocking position, the piston having a head which partially defines an enclosed first chamber and at least one flow passageway extending between the chamber in the body and a second chamber defined in part by a moveable member disposed in a cavity in the piston head, a pressure sensor in fluid communication with the chambers for sensing ambient pressure, a bonnet attached to the body, a stem bushing disposed in the bonnet in spaced relationship with the head of the piston, the stem bushing having a surface defining another portion of the first chamber and an internal bore in which the stem is slidably supported, at least one spring and at least two pivotally interconnected link members operatively disposed between the spring and the stem; and crank assembly for selectively engaging the pivotally interconnected link members for urging the piston into said first position.

In accordance with a preferred embodiment of the invention, there is disclosed q reset relief valve having a body having an inlet port, an outlet port, and an interior wall partially defining an enclosed chamber, a piston disposed in the body and moveable between a first position at which the piston is disposed in fluid flow-blocking relationship between the inlet port and the outlet port of the body and a second position at which the piston is removed from the fluid flow-blocking position, the piston sealably engages a cylindrical member positioned above the inlet port in the body when in the first position, where the member has an inner diameter substantially equal to the outer diameter of the piston, a bonnet attached to the body, a stem bushing disposed in the bonnet in spaced relationship with the head of the piston, the stem bushing having a surface defining another portion of the first chamber and an internal bore in which the stem is slidably supported, a transducer for sensing fluid pressure on the piston electrically connected to a computer for storing and analyzing pressure data from operation of the valve, at least one spring and at least two pivotally interconnected link members operatively disposed between the spring and the stem; and crank assembly for selectively engaging the pivotally interconnected link members for urging the piston into the first position wherein the crank assembly has a first and second arm.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
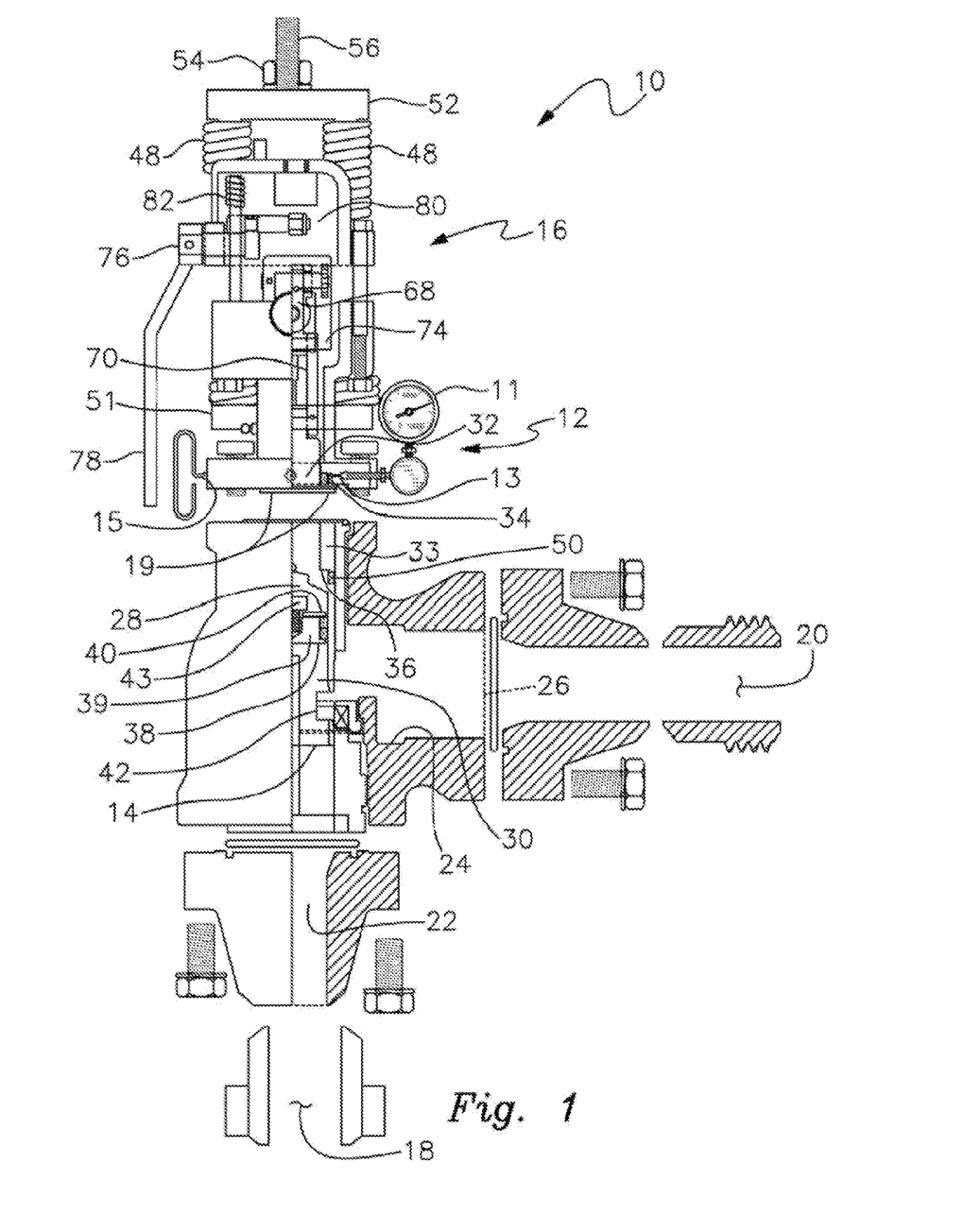
FIG. 1 is a partially exploded cross sectional view of a preferred embodiment of the invention.
Figure 2:
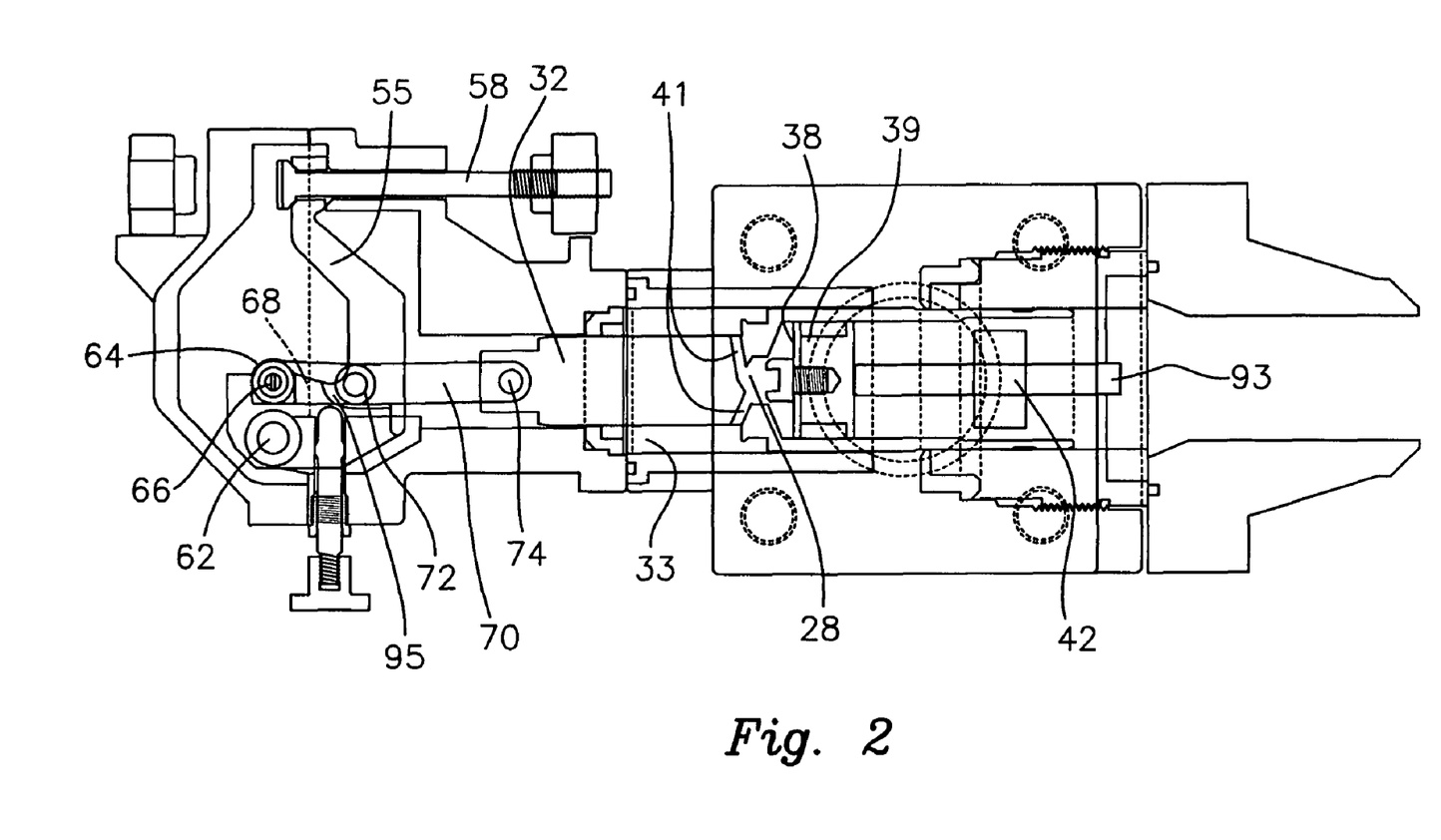
FIG. 2 is a plan view of a preferred embodiment of a reset valve set in the unactivated position.
Figure 3:
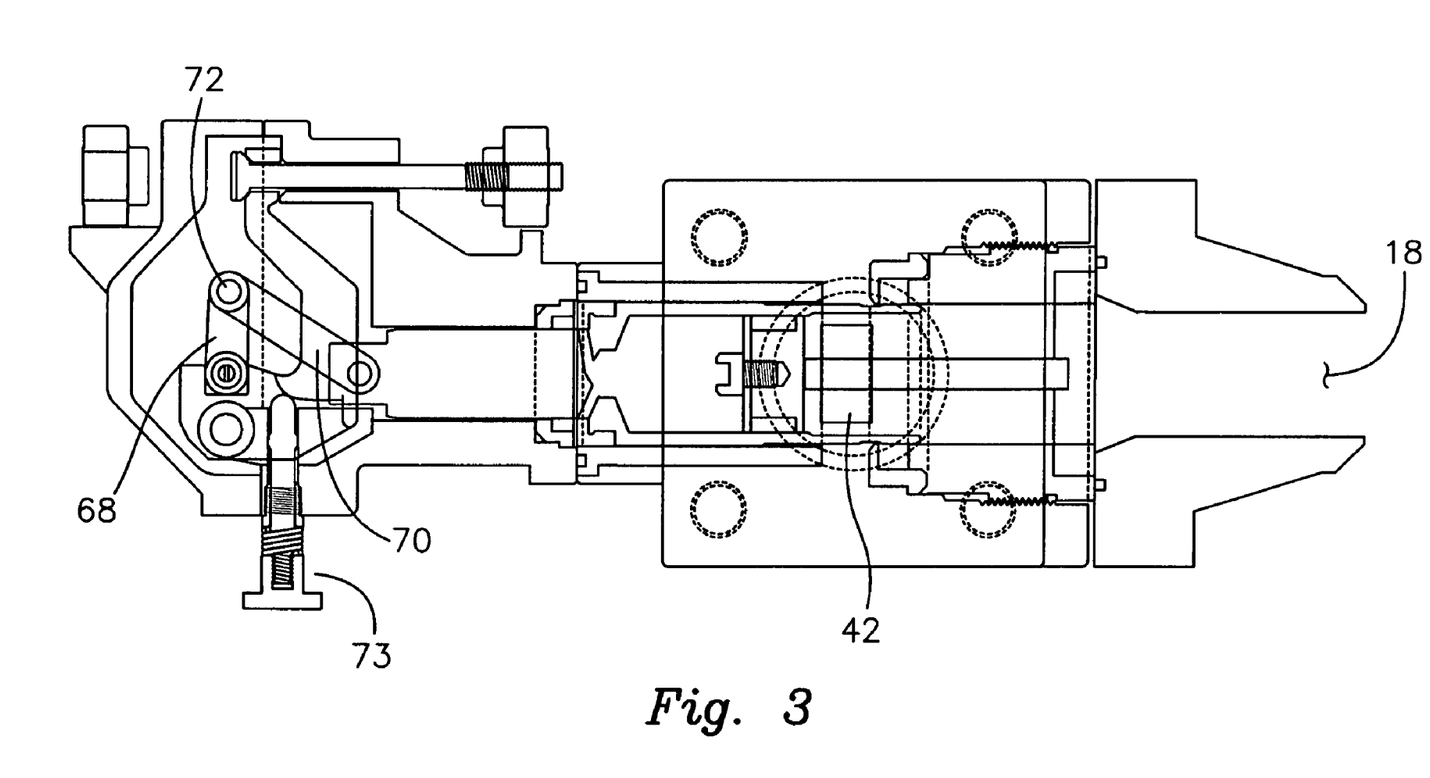
FIG. 3 is a plan view of a reset valve set in the open or activated position.
Figure 4:
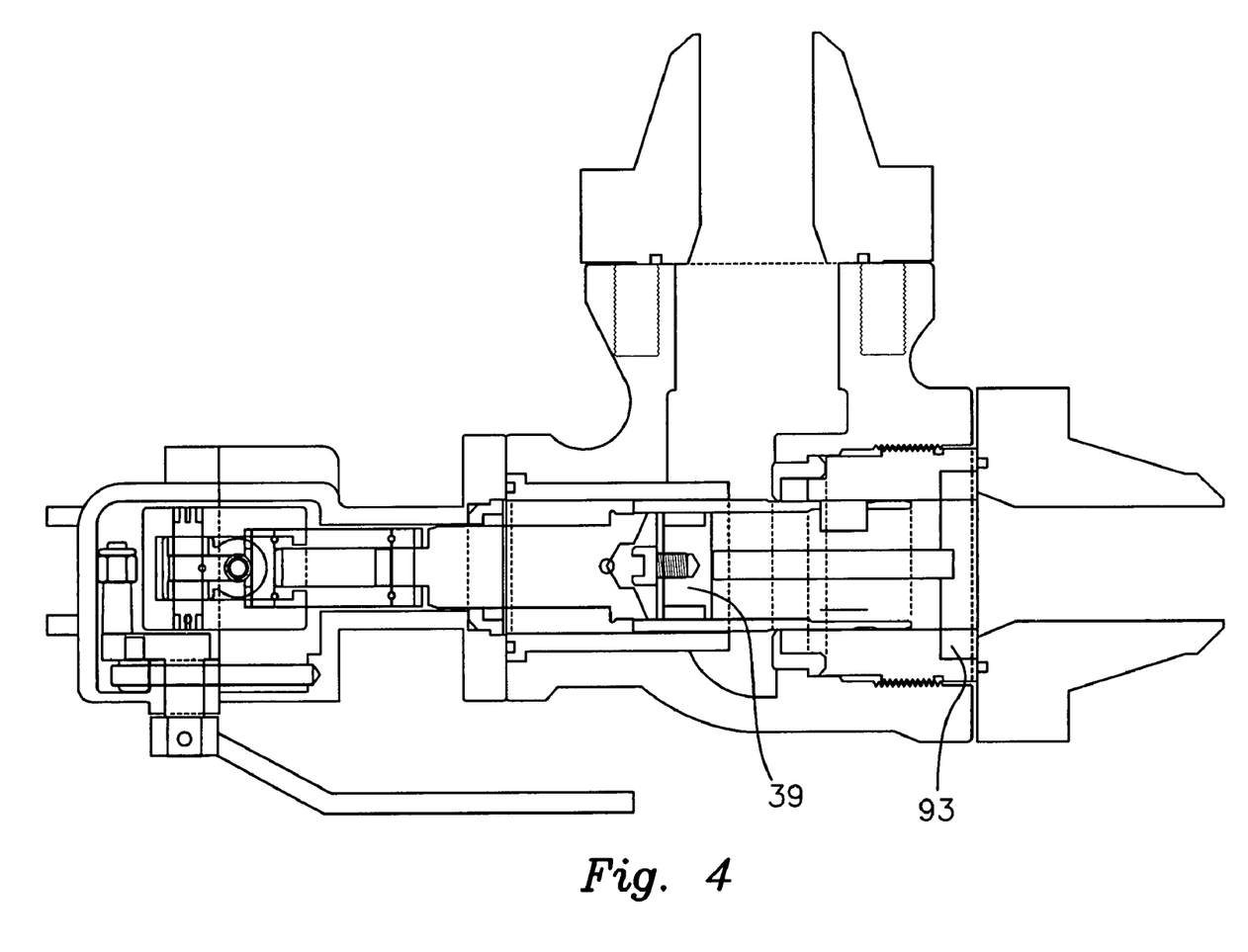
FIG. 4 is an elevational view of a reset valve

Turning now to FIG. 1, there is shown a partially exploded cross sectional view of the reset valve of the present invention. In the preferred embodiment of the present invention, shown in FIGS. 1-4, a pressure relief valve 10 has a body 12, a piston 14 movably disposed within the body 12, and a bonnet assembly 16. FIGS. 2-4 are shown in a horizontal orientation relative to the typical assembled vertical field position and for ease of illustration do not show the pressure sensor assembly of the present invention but help understand the operation of the valve. References herein to an upward or downward movement or upper and lower positions refer to an orientation of FIGS. 2-4 where bonnet assembly 16 is positioned above piston 14 in a vertical orientation. The relief valve 10 is typically connected to a line conduit 18 in fluid communication with a fluid system containing a fluid under pressure, and a discharge conduit 20 in fluid communication with a fluid containment or storage structure, sump, drain line, or other arrangement for receiving fluid relieved from the fluid system.

For illustration purposes only, a break is shown in FIG. 1 between the upper and lower portion of the valve where the pressure sensor assembly 12 is placed.

The valve body 12 has an inlet port 22 that is adapted to receive the line conduit 18, and an internally disposed annular chamber 24 in fluid communication with an outlet port 26 that is adapted to receive the discharge conduit 20. The body 12 also has an internal bore providing an interior cylindrical wall surface that partially defines enclosed chambers 28 and 33, the features and function of which are disclosed below in more detail.

Piston 14 has a partially hollow head 30 and an elongated stem 32 extending outwardly from head 30. A stem bushing 34 is mounted in the bonnet assembly 16 such that the bottom surface of the bushing 34 is spaced from the piston head 14 when the piston 14 is at a first, or set, position as shown in FIGS. 1 and 2.

Disposed in a cylindrical cavity in said piston head 30 is a cylindrical inner piston 39 having a piston cap 40. Inner piston 39 is a round disc that freely moves in sealed engagement within said cavity of said piston. Inner piston 39 has at its upper portion piston cap 40 attached with cap screw 43. Inner piston 39 is freely moveable within said cavity in piston head 30 and the upper surface of piston cap 40 defines the lower portion of lower enclosed chamber 28. At the first position, the head 30 and inner piston 39 block the flow of fluid between the inlet port 22 and the outlet port 26. The head has an annular upper surface 36 that defines, in part, a lower wall of upper enclosed chamber 33. When piston head 14 is at its first, or set position, the lower portion of inner piston 39 is in fluid contact with the inlet conduit. Piston head 30 also has an exhaust port 42 which is shown as a rectangular cut-out portion of the piston head.

Importantly, the piston 14 has one or more apertures 41 (shown in FIGS. 2 and 5A) that extend through the upper portion of head 30 of the piston 14 providing a hydraulic fluid flow path between lower enclosed chamber 28 and upper enclosed chamber 33. The key function of the apertures 41 is to provide a controlled flow path for hydraulic fluid to pass between upper and lower chambers 28 and 33 when the piston 14 is at its first and second positions. Chambers 28 and 33 may be filled with any variety of fluids, including, among others, oil, anti-freeze, water, or lubrication grease. In addition, in certain applications, said chambers may be filled with other materials including gases or air. Said chambers are sealed off from the working fluid by the arrangement of the piston head, disc and piston chamber. This controlled hydraulic fluid path between chambers 28 and 33 cushion the compressive force of the piston 14 when it is moved from its above-described first position to a second, or relief, position at which the piston head 30 is moved from its flow blocking position between the inlet and outlet ports, 22 and 26. As can be seen in FIGS. 1 and 3, when piston 14 is raised to the second position, there is essentially no impediment to fluid flow between the line conduit 18, which typically contains pressurized fluid, and the discharge conduit 20 which is typically open to atmosphere, or ambient pressure through exhaust port 42.

Situated above chamber 33 and in fluid communication therewith, is the pressure sensor assembly of the present invention. A break is shown in FIG. 1 between the upper and lower portion of the valve where the pressure sensor assembly is placed for ease of illustration and the piston stem 32 is shown in dotted lines. The transducer 13 is positioned in a sealed ring 17 that is in fluid communication with the hydraulic fluid that moves between chambers 28 and 33 during operation. On the bottom of ring 17 are ports 19 that permit fluid flow from chamber 33 into the ring whereby the transducer can sense pressure in the fluid. Pressure is sensed by the transducer 13 which is capable of sensing the pressure on the fluid which in turn transmits that pressure reading to a gauge 11 and electronically to a computer control system. Gauge 11 may be analog or digital depending on the application. As pressure is being monitored and data points stored, the user is capable of controlling the valve and making sure its operation is within desired operating limits before during and after the valve is activated. Set screw 15 permits access to the system for bleeding off pressure. The pressure gauge may be of any of a variety of configurations including analog, digital, LED, or other display types.

Reset stem 73 (shown in FIG. 3) may be used to facilitate manually moving the valve into an open position when not under pressure or tripping the valve when under pressure. To reset the valve 10, pressure must be relieved from the inlet port 22, whereupon the reset handle 78 can be manually rotated counterclockwise to the rightward position shown in FIG. 2. This manual movement of the reset handle will cause the roller 80 to move the upper link 68 back into vertical alignment with the lower link 70. The reset handle is operably connected to a reset assist tab positioned in a perpendicular position relative to the engaged position of the handle. The tab is operably connected to the handle and is positioned outward when the crank is in the set position. Pushing the button in and resetting the crank handle causes the tab to extend outward indicating it is in the set position. Push the button in and reset the handle and In a preferred embodiment, the tab moves approximately ⅛ to ¼ inch from the in, or unset position, versus out, the set position.

In alternative embodiments other sensors may be employed in conjunction with or instead of the pressure sensor such as temperature sensors, viscosity sensors or other parameters of interest to the user that are interconnected in a similar manner to measure ambient features of the oil filled chamber. By connecting such data in a real time system to a computer controlled system, the valve and mud pump may be operably controlled based on any of a variety of pre-determined criteria.

By storing data on a recurring basis, the operator can design the system with greater degrees of control and can analyze the data associated with an activation of the valve to better utilize the valve and other pumps in the system. Other ports are positioned around the pressure sensor assembly for insertion of oil or other hydraulic fluid.

Figure 7:
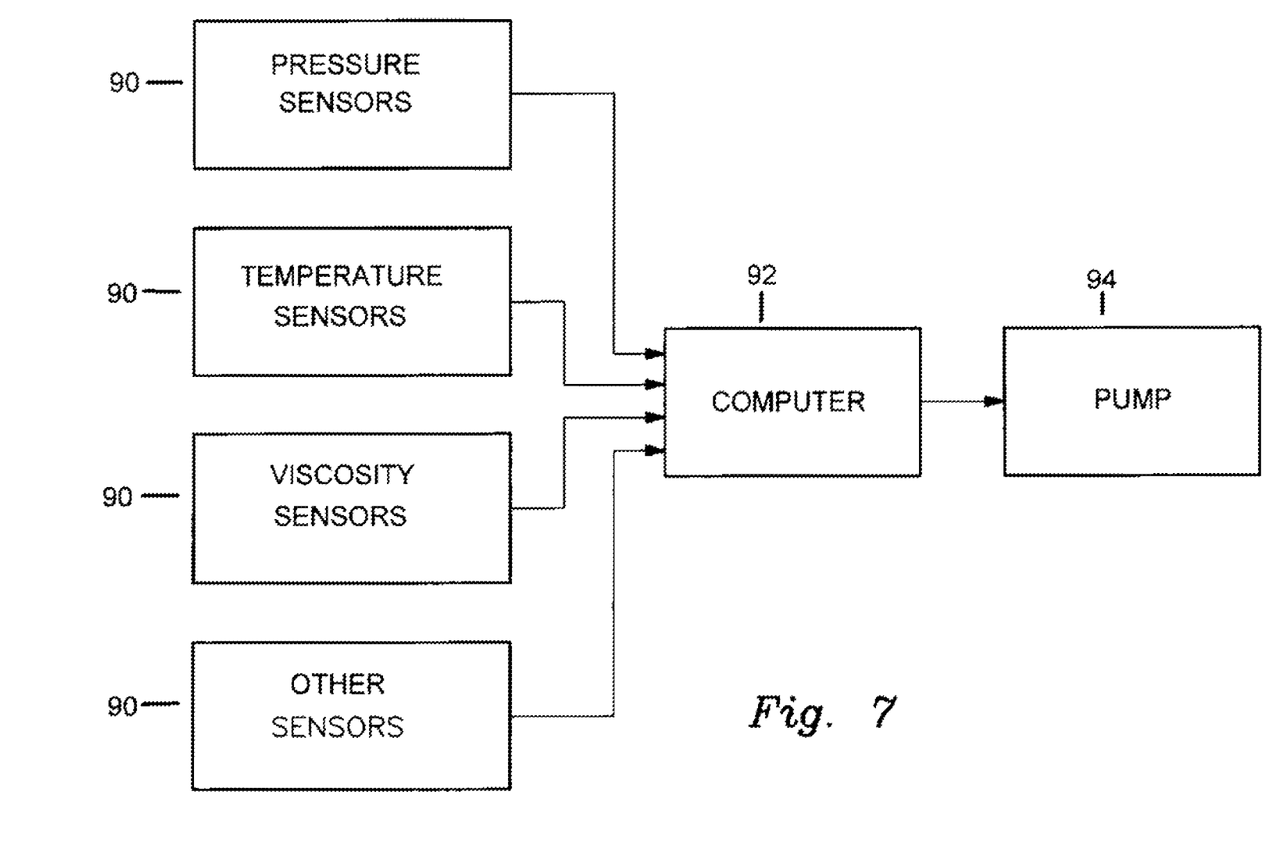
FIG. 7 shows a schematic diagram of sensors on a relief valve and a computer and its interconnection to a pump in a preferred embodiment of the invention.

FIG. 7 shows a schematic diagram of the interconnection of sensors 90 on a relief valve to a computer with data being sensed by the computer 92 from the sensors where the computer is in operable connection to pump 94. Data associated with operation of the valve can in turn be processed by computer 92 to better utilize pump 94 and maintain the valve within its operating limits by controlling the pump before or during a pressure spike to potentially avoid a shutdown of the overall system.

Software may be developed for the valve including a method of acquiring multiple streams of analog data as real time occurrences and simultaneously displaying and storing them via digital interface using an interface system for later analysis. Using such software, the control computer can can monitor and record, in a preferred embodiment, from 1 to 4 simultaneous analog pressure readings at a rate of 1 sample/sec per channel or faster. In addition a secondary capacity to monitor 4 digital only inputs may be utilized in the current system, with desired inputs.

The computer system of a preferred embodiment may be of any of a variety of specifications with sufficient memory and processing speed to perform the calculations and interpretation desired by the user. One system of a preferred embodiment may have the following minimum specifications:
Processing; Toshiba® Pocket PC e800
System Characteristics
  Processor
  Intel® PXA263 processor at 400 MHz
  Memory
  128 MB SDRAM
  32 MB CMOS Flash ROM
  Application Memory: 32 MB NAND Memory (Flash ROM Disk)
  Graphics/Video
  4.0" TFT Transreflective Color display; 240×320 (portrait) resolution (16 bit)
  Back light LED
  65,536 (64K) colors: 10 step brightness control (by Software)
  ATI Graphics Controller; 2 MB internal video memory
  Support Resolution/Color (VGA): (QVGA 320×240; VGA 480×640-User switchable)
  External VGA Connector (via optional Presentation Pack) External Resolution:
    640×480 64K colors @60 Hz
    800×600 64 k colors @60 Hz
  Input Devices
  Touch Panel: Analog resistance sensitive system touch panel
  Controls/Buttons: 5-way navigation button; 4 application keys-Calendar, Contacts, Task, Menu; 3 function navigator (Toshiba® Scroller) for Up, Down and Action; Reset switch; Voice record button; Power on/off button; Battery on/off switch; Hold switch; Wireless communication switch, Stylus pen
  Expandability
  1 Type I/Type II CF Card Slot (3.3V) (Used for Data Acquisition card)
  1 SD (Secure Digital) card slot (3.3V)—(Used for data storage memory card.)
  Communications
  Integrated Wi-Fi (IEEE 802.11b)*
  Physical Description
  Dimensions (L×W×H): 5.3"×3.0"×0.6"
  Weight: 6.8 oz.
  Power Supply
  AC Adapter: 5V/3 A DC output; 100-240V input voltage, 50/60 Hz frequency
  Battery Pack: Rechargeable, replaceable Lithium-Ion (Li-Ion) battery; 3.7V×1320 mAh Optional High Capacity Battery: Rechargeable, replaceable Li-Ion High Capacity battery; 2640 mAh
  Environmental Specifications
  Temperature: Operating: 0 to 40° C.; Storage: −20 to 65° C.
  Relative Humidity: 30% to 80%
  Altitude (relative to sea level): Operating: 10,000 ft, change rate 2000 ft/min; Storage: 40,000 ft, change rate 2000 ft/min
Data Acquisition; National Instruments® CF-6004 Data acquisition card & Wika® 10,000 PSI Pressure transducers.
  NI CF-6004
  Ultra portable DAQ device for Compact Flash
  4 channels of 14-bit analog input Up to 200 kS/s single-channel sampling
Up to 132 kS/s multichannel (aggregate) sampling
4 digital I/O lines (3.3 V)
Wika® Pressure Transducers
   0-10,000 PSI pressure sensitivity.
   6-30 vdc input excitation voltage
   1-5 vdc output signal
   Simple 3 wire connections (plus ground)

The software should be a data acquisition and storage system, preferably, with a 90 day continuous storage capacity. The computer software permits real time evaluation of ambient pressure in the system and control of the valve according to the user's preferences. Due to the recurrent sensing of data, the use may analyze the date to determine the cause of the pressure spike that may have set off the valve.

In an illustrative example, the pressure relief valve 10 is installed in a system for pumping drilling mud composed of water, clay and chemical additives, down through the inside of a drill pipe of an oil well drilling operation. The drilling mud is pumped at very high pressure, for example up to 7,500 psi (51,675 kPa), so that the mud is forced out through a bit at the lower end of the drill pipe and returned to the surface, carrying rock cuttings from the well. In this illustrative example, the lower surface 38 of the inner piston head 39 has a surface area substantially equal to the inner diameter of piston head 30 and piston head 30 has an outer diameter that is substantially equal to that of the cross-sectional area of the inlet port 22. The piston stem 32 has a diameter of about 1.625 in (4.13 cm), thus reducing the surface area of the upper surface 36 of the piston head 30 to an area less than the area of surface 38.

In normal operation, with the line, or system pressure at a pressure less than the predetermined value at which it is desired to relieve system pressure, the piston 14 is at its first position. At this position, fluid will flow from the inlet port 22, and stop at the bottom surface of inner piston 39, until there is essentially equal pressure on inner piston 39 and in turn within enclosed chambers 28 and 33. Exhaust port 42 is positioned so that it does not permit working fluid flow when the valve is in its first position to enter annular chamber 24. However, when the line pressure exceeds the predetermined value, typically as an almost instantaneous pressure spike resulting from line blockage, the valve 10 will trip in the manner described below, rapidly raising the piston head 30 away from its first position. Initially, the piston 14 will raise very rapidly, thereby decreasing the volume of the enclosed chamber 33, until the pressure in the enclosed chamber 33 is greater than the pressure of the fluid at surface 38 of the inner piston 39. As the head 30 continues to move upwardly toward the stem bushing 34, the volume of the enclosed chamber 33 decreases and, since the hydraulic fluid oil of this example is essentially a noncompressible fluid, the rate of upward movement of the piston 14 is restricted by the rate at which hydraulic fluid can be moved from the enclosed chamber 33, through the apertures 41 into enclosed chamber 28. Inner piston 39 moves upward slightly as the piston moves into its second position. Thus, the impact of the piston head 30 against the stem bushing 34, at the upward limit of travel of the head 30 is cushioned, and no rebound forces are imposed on the piston head 30 that would cause it move toward the closed position. Depending upon the viscosity of the hydraulic fluid placed in chambers 28 and 33, both the number and diameter of the apertures may vary and can be readily determined by one of ordinary skill in the art of fluid mechanics. In the above-described illustrative application in which oil is the hydraulic fluid, two apertures 41, each having a diameter of about 0.1875 in (0.476 cm), are equidistantly radially spaced from each other around the longitudinal centerline of the piston head 30, one at an angle relative to ground of 10 degrees and the other at an angle relative to ground of 25 degrees. Alternatively, the apertures 41 could be formed by drilling the desired diameter orifice through replaceable plugs that could be selectively inserted into the piston head 30. Such an arrangement would provide appropriately sized apertures for varying fluid viscosity applications, even allowing some of the plugs to have a solid construction if fewer apertures were required.

The pressure sensor and transducer are placed in fluid communication with the enclosed chambers to permit ambient pressure sensor readings. As fluid pressure builds in the system, the fluid moves into the bushing at the top of the piston chamber through a series of holes. Because the sensor is in fluid communication with the hydraulic fluid, it permits pressure readings that directly reflect the pressure on the valve at all relevant times.

The pressure relief valve 10 embodying the present invention also has a first means for urging the piston into the above-described first position illustrated in FIGS. 1 and 2. With reference to FIG. 1, the first means includes a pair of load springs 48 that are controllably compressed between upper and lower spring retainers 50 and 52. The upper retainer 52 is adjustably mounted on the bonnet assembly 16 by an adjustable nut 54 threadably secured to an adjusting stud 56. With reference to FIG. 2, the lower end of a load screw 58 is secured to the lower retainer 50 and has an enlarged head at its upper end that fits into a mating socket provided at one end of a pivot crank member 55 and, as a result of the downward force applied by the compression springs 48 on the lower spring retainer 52, urges the socket end of the pivot crank 55 in a downward direction. The pivot crank member 55 is pivotally mounted on a crank pivot pin 62. The second end of the crank member 55 biasedly engages the outer ends of two spiral springs 64 that are concentrically mounted on a top crank pin 66 that is rotatably mounted in the second end of the pivot crank 55. The inner ends of the two spiral springs 64 are secured to the top crank pin 66, such that a small bias force acting in a counterclockwise direction as viewed in FIG. 2, is applied to the top crank pin 66. The upper end of an upper link 68 is attached to the top crank pin 66 and accordingly moves in concert with the pin 66 about its axis. The lower end of the upper link 68 is pivotally interconnected with the upper end of a lower link 70 by an upper link pin 72. The lower end of the lower link 70 is pivotally attached to an upper end of the piston stem 32 by a lower link pin 74. Lower link 70 is also positioned on the other side of the pin so that along its entire length is a uniform width which can be pressed against the crank. Lower link 70 is flattened and its planar surface has the shape of an oval with two opposing parallel sides and two opposing substantially rounded ends. This construction provides added strength to the linkage and permits proper engagement with the crank as more fully described below.

FIG. 2 shows a plan view of the invention with the reset valve set in the closed or inactivated position. In this position the fluid flow is prevented due to the presence of the piston and inner piston being in a position that blocks the flow of fluid from the input port to the output port.

When the valve 10 is in its operatively set position, with the piston head 30 at the first, or flow-blocking position, the upper and lower links 68 and 70 are vertically aligned thereby forming an essentially rigid line such that the compression force of the springs 48 is transferred through the load screw 58 to the pivot crank 55, thence through the top crank pin 66 to the aligned upper and lower links 68 and 70 and then to the upper end of the piston stem 32. If the pressure against the lower surface 38 of the inner piston 39 increases to a value greater than the compressive force applied to the upper end of the piston stem 32 by the load springs 48, the second end of the pivot crank 55 will be forced to rotate in a clockwise direction, as viewed in FIG. 3, causing the upper end of the upper link 68 to be moved out of alignment with the lower link pin 70. At this instant, the upper link pin 72 will immediately move leftwardly, causing the upper and lower links 68 and 70 to be moved out of vertical alignment, and thereby allowing the piston stem 32 to move upwardly. When the links 68 and 70 are moved out of alignment, the upward movement of the piston 14 is, as described above, impeded only by the flow of fluid from the enclosed chamber 28 through the apertures, or orifices, 41 into the enclosed chamber 33. As can be readily seen, line or working fluid is quickly expelled through exhaust port 42 facilitating the rapid flow of line fluid to the discharge conduit. The size and shape of exhaust port 42 may be of any a variety of configurations including an ellipse, oval, square or other opening shape. So long as the port is positioned so that no working fluid may pass when the valve is in the first position and upon activation is moved into a position to permit fluid flow, exhaust port 42 performs in the desired manner.

Because the upward movement of the piston 14 is hydraulically cushioned, there are no rebound, or "bounce" forces imposed on the piston 14, and accordingly the piston will not undesirably reset itself. The valve 10 embodying the present invention provides a second means for resetting the valve, i.e., for engaging the first means for urging the piston 14 into the first position. The second means includes a reset crank 76 that is rotatably mounted in the bonnet 16, and has a handle 78 at one end extending externally of the bonnet assembly 16 and a roller 80 at a second end disposed within the bonnet 16. The reset crank 76 is biased by a reset lower spring 82 whereby the roller 80 at the second end of reset crank 76 is maintained in a spaced, or clearance, position from the upper link 68, even when the upper link 68 is displaced from vertical alignment with the lower link 70, i.e., when the piston 14 is at the second position.

FIG. 4 shows an additional side view of the reset valve in accordance with the present invention. Inner piston 39 is impeded in its downward movement by T-bar 93 composed of a horizontal member with an opening and a longitudinal bar affixed to said horizontal member. T-bar 93 is positioned to prevent inner piston 39 from moving too far toward inlet port 22 and potentially out conduit 18. T-bar 93 may be designed in any number of configurations that inhibit downward movement of inner piston 39 to fit the circumstances present. In some applications, T-bar 93 may be unnecessary altogether.

Figure 5A:
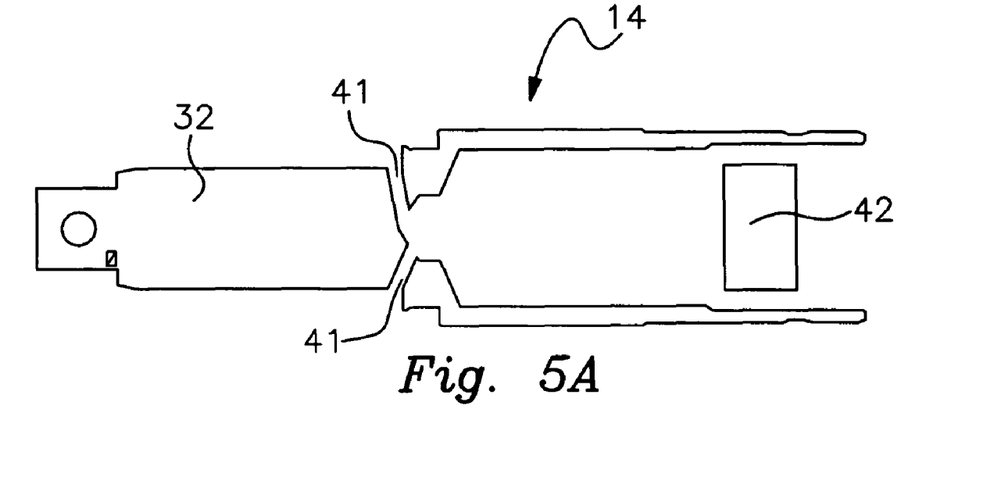
FIG. 5A is a cross sectional plan view of the piston used in a preferred embodiment of the invention.
Figure 5B:
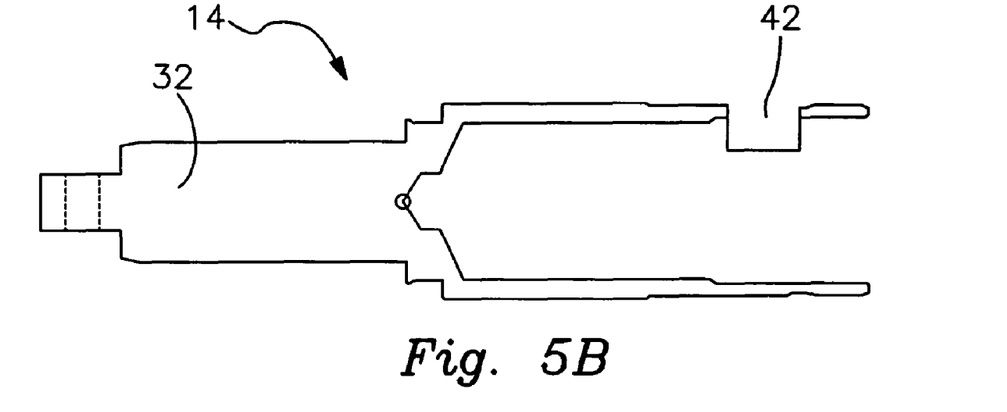
FIG. 5B is a cross sectional elevation view of the piston used in a preferred embodiment of the invention.

FIGS. 5A and 5B show piston 14 in plan and elevational views. FIG. 5A shows two fluid flow apertures 41 previously described. Exhaust port 42 is positioned on the side wall of piston head 30 to permit rapid fluid flow of discharge fluid upon activation of the valve. As previously noted, the size and location of exhaust port 42 may be varied depending on the fluid mechanics of the subject fluid and in some cases may be omitted altogether depending on the forces present and the need for rapid evacuation of fluid.

Figure 6A:
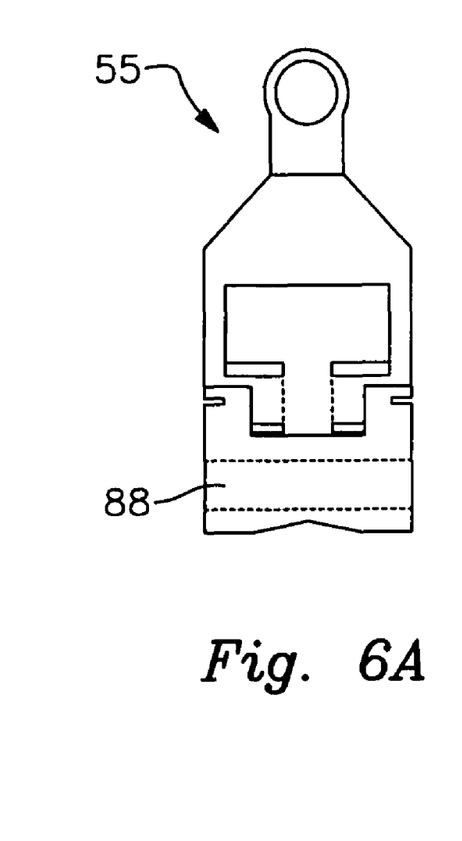
FIG. 6A is a top plan view of the crank used in a preferred embodiment of the invention.
Figure 6B:
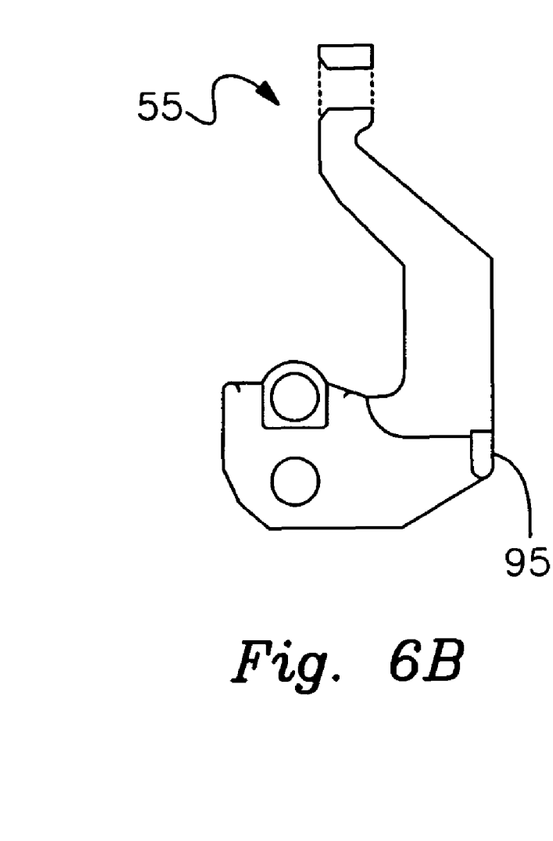
FIG. 6B is a bottom plan view of the crank used in a preferred embodiment of the invention.
Figure 6C:
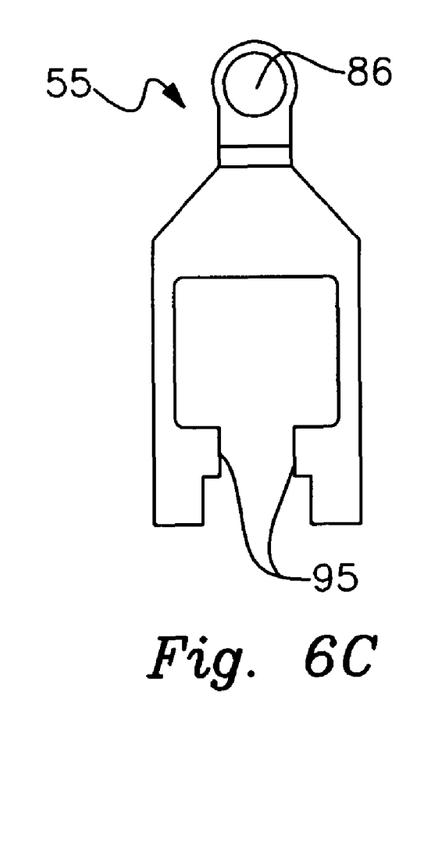
FIG. 6C is a side elevational view of the crank used in a preferred embodiment of the invention.

FIGS. 6A, 6B, and 6C show crank 55. Load bearing bolt 58 goes through socket 86 and provides mechanical connection between crank 55 and the load bearing springs as previously described. Crank 55 has a cross bar 88 that provides greater impact strength to the crank. At the back of crank 55, as seen in FIGS. 6B and 6C, there is tab or millstop 95 positioned on each side of the crank. Link 70 shown in FIG. 3, for example, is one of a pair of links that are positioned on opposite sides of crank 55 and each engage their respective tabs or millstops on crank 55 as described above. Tab or Millstop 95 of said crank 55 engages link 70 at pin 72 connecting the upper and lower links shown in FIG. 2. As pressure mounts on the crank caused by increasing line pressure on the piston, the linkages engage the tab or millstop and at the pre-determined force provided by the piston against the load bearing springs, the pin connecting the two linkages is nudged much like kicking someone in the back of the knee and the longitudinal arrangement of the two links is broken permitting the piston to move in an upward direction.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the claims.

What is claimed is:

1. A reset relief valve comprising:
   a body having an inlet port, an outlet port, and an interior wall partially defining an enclosed chamber;
   a piston disposed in said body and moveable between a first position at which said piston is disposed in fluid flow-blocking relationship between said inlet port and said outlet port of the body and a second position at which said piston is removed from said fluid flow-blocking position;
   said piston having a head which partially defines an enclosed first chamber and at least one flow passageway extending between said chamber in said body and a second chamber defined in part by a moveable member disposed in a cavity in said piston head;
   a variable pressure sensor in fluid communication with said chambers for sensing internal pressure;
   a bonnet attached to said body;
   a stem bushing disposed in said bonnet in spaced relationship with the head of said piston, said stem bushing having a surface defining another portion of said first chamber and an internal bore in which said stem is slidably supported;
   at least one spring and at least two pivotally interconnected link members operatively disposed between said spring and said stem; and
   crank assembly for selectively engaging said pivotally interconnected link members for urging said piston into said first position.

2. A reset relief valve as claimed in claim 1 wherein said pressure sensor is electronically connected to a data storage system.

3. A reset relief valve as claimed in claim 1 wherein said crank assembly includes a release shaft extending through a wall of said bonnet and having one end disposed in biased abutting contact with one of said pivotally interconnected link members when said piston is at said first position.

4. A reset relief valve as claimed in claim 1 wherein said pressure sensor is electronically connected to a mud pump.

5. A reset relief valve as claimed in claim 4 further comprising a computer controlled system for controlling said pump in response to said pressure sensor.

6. A reset relieve valve as claimed in claim 1 wherein said first and second chambers are filled with hydraulic fluid.

7. A reset relief valve as claimed in claim 6 wherein said fluid is oil.

8. A reset relief valve as claimed in claim 1 further comprising a longitudinal member disposed at the bottom of said piston chamber to prevent downward movement of said moveable member.

9. A reset relief valve as claimed in claim 8 wherein said longitudinal member is a T-shaped bar positioned along the longitudinal axis of the piston at the inlet port.

10. A reset relief valve comprising:
    a body having an inlet port, an outlet port, and an interior wall partially defining an enclosed chamber;
    a piston disposed in said body and moveable between a first position at which said piston is disposed in fluid flow-blocking relationship between said inlet port and said outlet port of the body and a second position at which said piston is removed from said fluid flow-blocking position;
    said piston having a head which partially defines an enclosed first chamber and at least one flow passageway extending between said chamber in said body and a second chamber;
    a pressure sensor in fluid communication with said chamber for sensing pressure that is electronically connected to a control system;
    a bonnet attached to said body;
    a stem bushing disposed in said bonnet in spaced relationship with the head of said piston, said stem bushing having a surface defining another portion of said first chamber and an internal bore in which said stem is slidably supported;
    at least one spring and at least two pivotally interconnected link members operatively disposed between said spring and said stem; and
    crank assembly for selectively engaging said pivotally interconnected link members for urging said piston into said first position wherein said crank assembly has a first and second arm connected by a cross bar.

11. A reset relief valve as claimed in claim 10 wherein said pressure sensor is electronically connected to a data storage system.

12. A reset relief valve as claimed in claim 11 further comprising a computer controlled system engaged to a mud pump for operating said pump in response to said pressure sensor.

13. A reset relief valve as claimed in claim 10 wherein said crank assembly has at least one tab for engaging said pivotally interconnected link members at a link between said members.

14. A reset relief valve as claimed in claim 10 wherein said piston head has a hollow portion with an opening.

15. A reset relief valve as claimed in claim 10 wherein said crank assembly includes at least one spring and at least two pivotally interconnected upper and lower link members operatively disposed between said spring and said stem wherein said lower link is substantially oval along its planar surface.

16. A reset relief valve comprising:
    a body having an inlet port, an outlet port, and an interior wall partially defining an enclosed chamber;
    a piston disposed in said body and moveable between a first position at which said piston is disposed in fluid flow-blocking relationship between said inlet port and said outlet port of the body and a second position at which said piston is removed from said fluid flow-blocking position;
    said piston sealably engages a cylindrical member positioned above said inlet port in said body when in said first position, where said member has an inner diameter substantially equal to the outer diameter of said piston;
    a bonnet attached to said body;
    a stem bushing disposed in said bonnet in spaced relationship with the head of said piston, said stem bushing having a surface defining another portion of said first chamber and an internal bore in which said stem is slidably supported;
    a transducer for sensing fluid pressure on said piston electrically connected to a computer for storing and analyzing pressure data from operation of the valve;
    at least one spring and at least two pivotally interconnected link members operatively disposed between said spring and said stem; and
    crank assembly for selectively engaging said pivotally interconnected link members for urging said piston into said first position wherein said crank assembly has a first and second arm.

17. A reset relief valve as claimed in claim 16 wherein said piston has a head which partially defines an enclosed first chamber and at least one flow passageway extending between said chamber in said body and a second chamber defined in part by a moveable member disposed in a cavity in said piston head.

18. A reset relief valve as claimed in claim 16 wherein said crank assembly has a first and second arm connected by a cross bar.

19. A reset relief valve as claimed in claim 16 where said piston has a head which partially defines an enclosed first chamber and at least one flow passageway extending between said chamber in said body and a second chamber.

* * * * *